United States Patent [19]

Steenhuisen

[11] Patent Number: 5,041,218

[45] Date of Patent: Aug. 20, 1991

[54] WATER PURIFICATION SET AND CHEMICALS UNIT THEREFOR

[75] Inventor: Johannes E. Steenhuisen, Olst, Netherlands

[73] Assignee: Duphar International Research B.V., Weesp, Netherlands

[21] Appl. No.: 450,516

[22] Filed: Dec. 14, 1989

[30] Foreign Application Priority Data

Dec. 19, 1988 [NL] Netherlands ............................ 8803105

[51] Int. Cl.$^5$ ................................................ C02F 9/00
[52] U.S. Cl. ..................................... 210/202; 210/206; 210/259; 210/266; 210/282
[58] Field of Search ......................... 210/202, 205–207, 210/257.1, 259, 265, 266, 282

[56] References Cited

U.S. PATENT DOCUMENTS 4,151,092  4/1979  Grimm et al. ...................... 210/282

Primary Examiner—Ivars Cintins
Attorney, Agent, or Firm—Stevens, Davis, Miller & Mosher

[57] ABSTRACT

The invention relates to a water purification set comprising a container holding a filtering unit and a chemicals unit, said container comprising two compartments having such dimensions that the filtering unit can be accommodated in one compartment and the chemicals unit can be accommodated in the other compartment, and in which the compartment holding the filtering unit can be closed separately by means of a cover, the cover of the compartment holding the chemicals unit being proportioned so that the said latter cover, in closed condition of the compartment holding the filtering unit, can at least partly also cover the cover of the said latter compartment.

The invention further relates to a chemicals unit to be unsed for the said water purification set comprising in individual closed reservoirs (i) a chlorinating agent, (ii) and adsorption agent, and (iii) a coagulation and/or flocculation agent and optionally one or more other auxiliary filtering means, in which the reservoirs are connected together in such a manner that, upon use of the chemicals unit, the chemicals are placed available in the correct sequence of adding them to the water to be purified, namely (i)→(ii)→(iii).

5 Claims, 2 Drawing Sheets

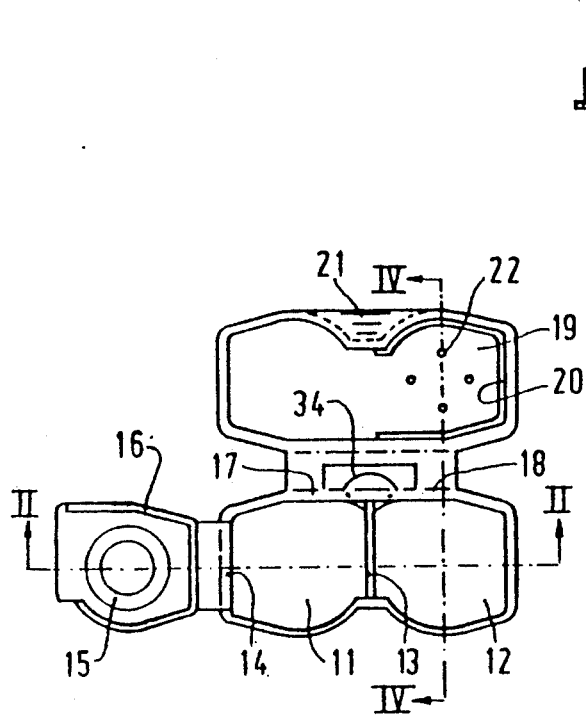
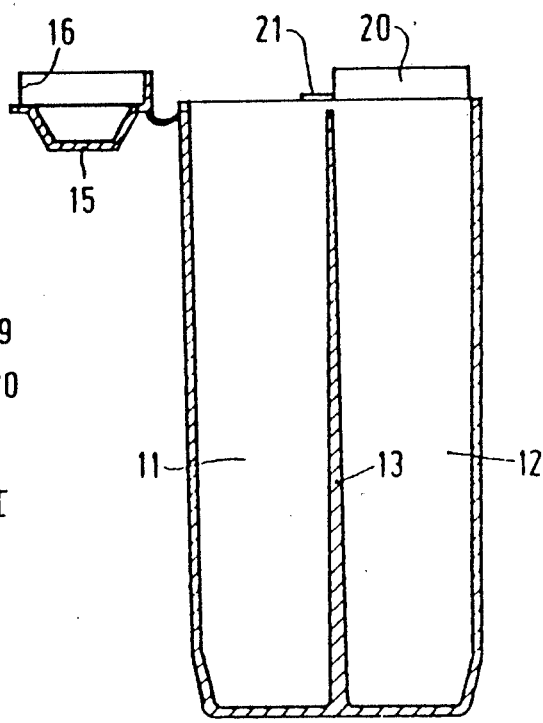
FIG. 1
FIG. 2
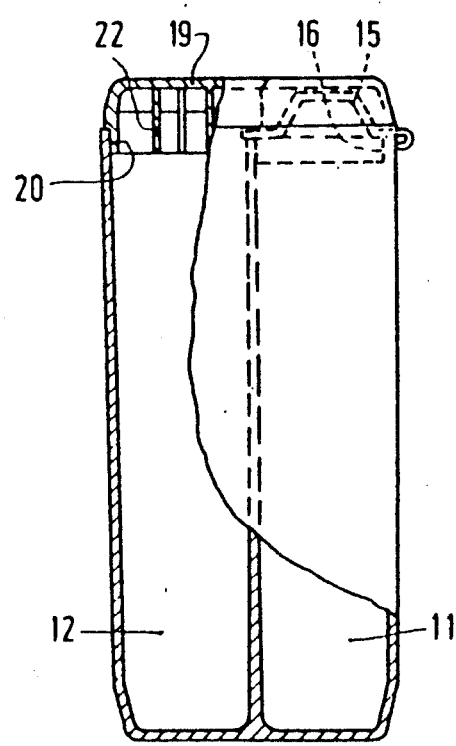
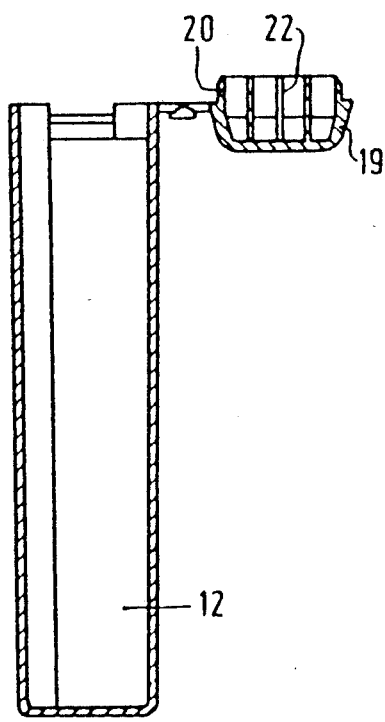
FIG. 3
FIG. 4

WATER PURIFICATION SET AND CHEMICALS UNIT THEREFOR

The invention relates to a water purification set comprising a container holding a filtering unit and a chemicals unit. Such a water purification set is intended for the purification of contaminated water, usually surface water, before drinking it. This will be necessary in particular when there is a need for drinking water while no pure tap water is available. This may occur in general with soldiers in the field during maneuvers or in war conditions, or also when citizens are under primitive conditions. In order to be able to provide the need for drinking water in such emergency conditions, one must often resort to contaminated surface water. A purification succeeded by a filtration of the water is then recommendable. This may be done, for example, by chlorinating a quantity of the water preferably collected in a reservoir, for example, a case-bottle, by means of a suitable chlorinating agent, in which organic impurities are converted into harmless constituents by oxidation. Adsorption with active carbon may then be used, after which coagulation and/or flocculation under the influence of coagulation agents and/or flocculation agents, sedimentation, and the like may be necessary. The agents and optional auxiliary means to be used for the purification of the water are available for example, in the form of a chemicals unit which can simply be applied by the user. For this purpose the various constituents of the chemicals unit are added successively to the quantity of water which it is desired to purify, for example, the quantity of water in a case-bottle. It will be obvious that after the purification the water comprises a large amount of solid constituents which should be removed before the water may be consumed. These solid constituents can be removed most simply by filtering. The said filtering is preferably carried out while using a filtering unit as described in the published European Patent Application 0243990.

In the above described emergency conditions in which the water purification set is usually used, the user may be inclined first to filter the surface water before carrying out the chemical purification, or to filter the water without any chemical pretreatment and then drink it. This may be fatal, in particular when in war conditions the surface water may be seriously contaminated, for example with bacterial impurities or with bacteriological or chemical warfare agents.

It is the object of the present invention to provide a water purification set which is constructed in such manner that the user is compelled as it were first to use the chemicals unit i.e. first to purify the water and to disinfect it and only then to use the filtering unit, namely to filter the adsorbed impurities.

This object can be achieved by means of a water purification set of the type mentioned in the opening paragraph, namely comprising a container holding a filtering unit and a chemicals unit, which water purification set according to the invention is characterized in that the container comprises two compartments having such dimensions that the filtering unit can be accommodated in one compartment and the chemicals unit can be accommodated in the other compartment, and in which the compartment holding the filtering unit can be closed separately by means of a cover, the cover of the compartment holding the chemicals unit being proportioned so that said latter cover, in closed condition of the compartment holding the filtering unit, can also cover at least partly the cover of the latter compartment. As a result of the provisions mentioned hereinbefore the user is compelled first to open the cover of the compartment holding the chemicals unit as a result of which the said unit becomes available for the purification of the water, before the compartment holding the filtering unit can be opened.

The water purification set according to the invention is preferably constructed in such manner that the two compartments adjoin each other, have a common partition wall and further have non-common side walls, the cover of the compartment holding the filtering unit being hingebly connected to the upper edge of one of the side walls of the said compartment, the other cover being also hingebly connected to the upper edge of one of the side walls of the compartment holding the chemicals unit or to the upper edges of two side walls of both compartments, which side walls are situated in the elongation of each other. This embodiment is compact, hence can easily be carried by the potential user and can simply be handled upon use. It will be obvious that the covers of the two compartments must be constructed so that they can easily be opened, for example, with the thumb of the gloved hand.

The invention further relates to a container for the water purification set described hereinbefore, which container comprises two adjoining compartments which have a common partition wall and further comprise non-common side walls, in which the first compartment can be closed by means of a cover which is hingebly connected to the upper edge of one of the side walls of said first compartment, and in which the second compartment which is also hingebly connected to the upper edge of one of the side walls of said second compartment or to the upper edge of two side walls of both compartments, which side walls are situated in the elongation of each other, is proportioned so that said latter cover, in the closed condition of said first compartment can also cover at least partly the cover of said first compartment. Containers comprising more compartments are known, for example, a container having two compartments which can be closed individually, from British Patent Specification 1,573,392. However, a container according to the present invention which is intended for a water purification set and for this purpose is constructed in such manner as has been described hereinbefore, as a result of which the user is compelled first to open one compartment before the cover of the other compartment can be removed, is not known.

The invention also relates to a chemicals unit to be used for the water purification set described hereinbefore, comprising in individual closed reservoirs (i) a chlorinating agent, (ii) an adsorption agent and (iii) a coagulation agent and/or a flocculation agent, and optionally one or more other auxiliary filtering means The chlorinating agent serves to oxidize noxious impurities present in the water to harmless products and to disinfect the water. As a chlorinating agent may be used, for example, a hypochlorite like calcium hypochlorite Various active carbon qualities are available which may be used as an adsorption agent, in order to adsorb the excessive chlorine, the impurities not oxidized by the chlorinating agent and the oxidation products of the chlorination step. In order to ensure that the colloidal constituents of the water as well as the active carbon particles can readily be filtered, auxiliary filtering means, for example coagulation agents and/or floccullation agents (auxiliary flocculation agents) may finally be used. Various metal salts may be used as auxiliary filtering means like iron chloride and aluminum sulfate. Polymeric auxiliary filtering means like polyacrylamides are increasingly used. A combination of several auxiliary filtering means often gives the best results under the varying conditions of the contaminated surface water.

When the above-mentioned chemicals are used to purify contaminated water, the use in the correct sequence is necessary. This means that first the chlorinating agent has to be added, then the adsorption agent, and finally the auxiliary filtering means After filtering by means of the filtering unit a drinkable product which satisfies the requirements imposed hereinbefore is obtained in this manner. The said sequence of adding the chemicals has so far been prescribed in operating instructions attached to or provided in the water purification set.

However, such instructions often prove not to be satisfactory in practice The emergency conditions mentioned hereinbefore and in which the water purification set is usually used, are not suitable to carefully perform certain operations on the basis of written instructions. The light often is insufficient and in war conditions the sight of the soldier may be restricted by his gas mask. Moreover, the available time is often too short to read the instructions carefully before carrying them into effect.

The present invention provides a solution to this problem by constructing the chemicals unit for a water purification set in such a manner that the sequence in which the chemicals are to be added to the water to be purified thrusts itself as it were to the user. For this purpose, the chemicals unit comprises in individual closed reservoirs (i) a chlorinating agent, (ii) an adsorption agent, and (iii) auxiliary filtering means, the said reservoirs being connected together in such a manner that, when the chemicals unit is used, the chemicals are placed available in the correct sequence of adding them to the water to be purified, namely (i)→(ii)→(iii).

The chemicals unit according to the invention is preferably constructed in such a manner that the adsorption agent is accommodated in a container which at its open upper end is closed by a stopper having an external mounting for a glass break ampoule containing the chlorinating agent, and the closed bottom of which is provided externally with a means for detachably connecting a vial sealingly accommodating the auxiliary filtering means. This embodiment is particularly suitable because herewith the sequence of using the chemicals is fixed to a high extent, and also because such a chemicals unit can be constructed in such a compact form that the unit can easily be accommodated in the compartment of the container of the water purification set intended for this purpose. After having taken the chemicals unit in this embodiment out of the container of the water purification set the user will be inclined first to take the glass break ampoule which in fact is directly available and to add the contents to the water to be purified, then, after removing the stopper, to transfer the adsorption agent from the container into the water, and finally to detach the vial with the auxiliary filtering means from the bottom of the container and to add the contents to the water. Of course, the water to be purified has to be shaken for some time inbetween the additions; if desired, this can simply be made clear to the user by means of an enclosed pictogram. The stopper is preferably manufactured from a suitable, non-deformable, slightly resilient synthetic material, so that the break ampoule can be clampingly connected in the mounting of the stopper The vial may be manufactured from glass or a non-deformable synthetic material the container is preferably also made from a non-deformable synthetic material. As a result of the resilience of the material of the stopper, a good sealing is obtained between the stopper and the container.

The detachable connection of the vial to the bottom of the container may be carried out in various manners, for example, a clamping connection, a screw connection, a snap joint or a bayonet joint However it is advantageous to construct the said connection in such a manner that the vial is simultaneously closed and the container also serves as a seal of the vial. As a result of this it is not necessary for the user, in order to reach the auxiliary filtering means, after having detached the closed vial from the container, to open the said vial by unscrewing a separate cap from the vial; this is time-saving In this preferred embodiment the container with the adsorption agent is manufactured from a synthetic material and perpendicularly to the bottom externally provided with a circular-cylindrical member which forms one assembly with the container and, in cooperation with the bottom of the container, provides a sealing connection to the neck of the vial. So in this embodiment the vial is connected to the container with its neck in or around the circular-cylindrical member, the vial being simultaneously closed by the said member in cooperation with the bottom of the container.

In a favorable embodiment the circular-cylindrical member on the bottom of the container comprises internally a screwthread, fitting to the external screwthread on the neck of the connected vial, so that the vial when using the chemicals unit can easily be unscrewed from the said bottom. In order to further improve the closure of the vial, if desired, the bottom of the container may further comprise externally a circumferential upright edge provided within the circular-cylindrical member and, in cooperation with the said member, resiliently enclosing the upper edge of the neck of the connected vial.

The invention will now be described in greater detail with reference to a preferred embodiment which is shown in the drawings, in which:

FIG. 1 is a plan view of a container for a water purification set in the opened condition;

FIG. 2 is a longitudinal sectional view of the same container, also in the opened condition, viewed in front;

FIG. 3 is a longitudinal sectional view, partly a side elevation, of the same container as shown in FIGS. 1 and 2 in the closed condition;

FIG. 4 is also a longitudinal sectional view of the same container again in the opened condition but now viewed from aside.

Figure 5:
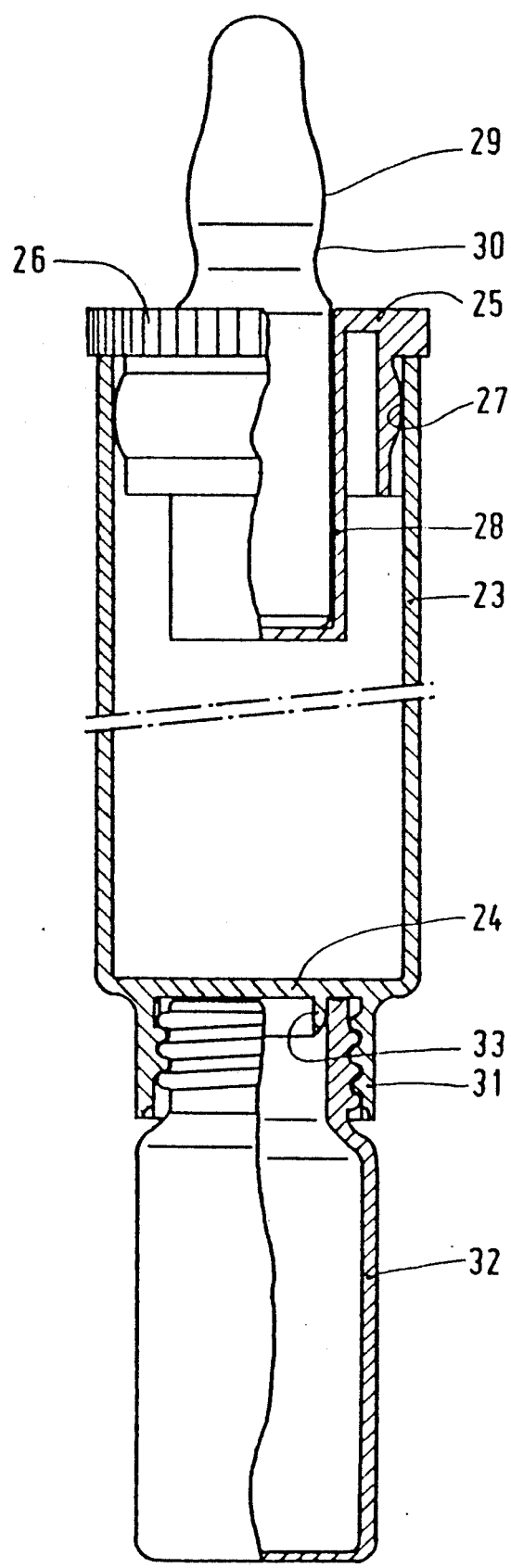
FIG. 5 is a longitudinal sectional view partly a side elevation, of a chemicals unit which can be accommodated in its associated compartment of the container shown in FIGS. 1-4.

The container shown in FIGS. 1-4 comprises two compartments 11 and 12 intended for accommodating therein a filtering unit and a chemicals unit, respectively, of a water purification set. The compartments are separated from each other by a partition wall 13 Compartment 11 can be closed separately by means of a cover hingebly connected to the upper edge of side wall 14. Said cover has a cap 15, for accommodating therein a mouth piece of the filtering unit, and an upright edge 16, which falls within the walls of compartment 11 upon closing said compartment A second cover 19 is hingebly connected to two side walls 17 and 18 of the compartments 11 and 12, which side walls are situated in the elongation of each other, the second cover in addition to compartment 12 also covering the compartment 11 closed by means of cover 15 This latter is most clearly shown in FIG. 3, in which the holders are shown as being closed by means of the covers. FIGS. 2 and 3 are mirror images of each other. Cover 19 also comprises an upright edge 20 which, when closing the container, falls within the walls of compartment 12 Cover 19 further comprises a fingergrip 21. The container further comprises and eyelet or ring 34 provided in a recess of cover 19 and which serves for the connection of the container, for example to the belt or to some other piece of equipment of the soldier Cover 19 is further internally provided with four upright locating members 22, which serve to keep the ampoule head of the chemicals unit in a centered position after said unit has been accommodated in compartment 12 of the container.

The chemicals unit shown on a considerably enlarged scale in FIG. 5 comprises a synthetic material container 23 having an adsorption agent which container on its open upper side is closed by means of a stopper 25 likewise of a synthetic material. The stopper which for improvement of the grip comprises an external milled or corrugated edge 26 clampingly fits in the container and comprises a spherically thickened side wall 27 to allow a better sealing of the container. Edge 26 has a slightly larger outer circumference than the container 23 so that the stopper can easily be taken from the container with the thumb of one hand. The stopper comprises an external mounting 28 for a glass break ampoule 29 which clampingly fits in the mounting of the stopper. The break ampoule including chlorinating agent may be opened upon use of the chemicals unit by breaking at break seal 30. On its outside the closed bottom 24 of the container 23 comprises a connection means for a glass vial in the form of a circular-cylindrical member 31 which is formed integrally with the synthetic material container and is screwthreaded. The said screwthread fits in the external screwthread on the neck of the glass vial 32. A circumferential, slightly resilient edge 33, together with the circular-cylindrical member 31, ensures that the vial comprising the auxiliary filtering means is well closed.

When using the water purification set the cover 19 of the container is opened so that the chemicals unit in compartment 12 is placed available. The chemicals unit is now taken out of the container, after which the glass break ampoule is available first After breaking at the break seal the contents of the ampoule are added to the water to be purified, after which water and chlorinating agent have to be shaken vehemently for some time. The stopper 26 is then removed from the container 23 and the contents of the container, i.e the adsorption agent, is also added to the water. After shaking for some time the third reservoir, viz the glass vial is opened by unscrewing it from the member 31. The auxiliary filtering means from the vial may now be added to the water. After shaking again for some time the water is ready for filtering. As a result of the removal of cover 19 from the container of the water purification set, the cover 15 has been uncovered so that it can in its turn be swung away. The filtration unit in compartment 11 now comes available for the user and the water which has meanwhile been purified chemically, may now be filtered.

I claim:

1. A water purification set comprising a container holding a filtering unit and a chemicals unit, the container comprising two compartments having such dimensions that the filter unit can be contained within a first compartment and the chemicals unit can be contained within a second compartment, and in which the first compartment is covered by a first cover, and the second compartment is covered by a second cover such that when the first cover is in a closed position, it can at least partly overlap the second cover, wherein the first and second compartments adjoin each other, have a common partition wall and further have non-common side walls, wherein either (1) the first cover id hingebly connected to an upper edge of one of said side walls of said first compartment, and the second cover is hingebly connected to an upper edge of one of said side walls of said second compartment, or (2) the first cover is hingebly connected to an upper edge of one of said side walls of said first compartment, and the second cover is hingebly connected to upper edges of the two side walls of the first and second compartments in which said latter side walls are coaxial with each other.

2. The water purification set of claim 1 wherein said chemicals unit comprises three individual closed reservoirs and, optionally, one or more additional auxiliary filtering means, said first reservoir containing a chlorinating agent, said second reservoir containing an adsorption agent and said third reservoir containing a coagulation agent and/or a flocculation agent, wherein the first, second and third reservoirs are connected together in such a manner that the chemicals are arranged in the following sequence for adding them to the water to be purified: chlorinating agent→adsorption agent→coagulation and/or flocculation agent, said chemicals unit being located inside said second compartment of said water purification set.

3. The water purification set of claim 2, wherein the adsorption agent is contained within a container which is closed at an upper end thereof by a stopper having an external mounting for a glass break ampoule containing the chlorinating agent, a closed bottom of the container being provided externally with means for detachably connecting a vial sealingly containing the auxiliary filtering means.

4. The water purification set of claim 3, wherein the container is manufactured from a synthetic material and is externally provided perpendicularly to the bottom with a circular-cylindrical member which is attached to the container and, in combination with the bottom of the container, provides a sealing connection to the neck of the vial.

5. A water purification set of claim 4, wherein the circular-cylindrical member comprises internally a screwthread which fits to an external screwthread on the neck of the vial, and optionally a circumferential upright edge provided within the circular-cylindrical member and, in combination with said member, resiliently encloses the upper edge of the neck of the vial.

* * * * *